July 23, 1963  B. L. MESSINGER  3,098,626
SYSTEM FOR STARTING GAS TURBINE POWER PLANTS
Filed Nov. 21, 1960  2 Sheets-Sheet 1
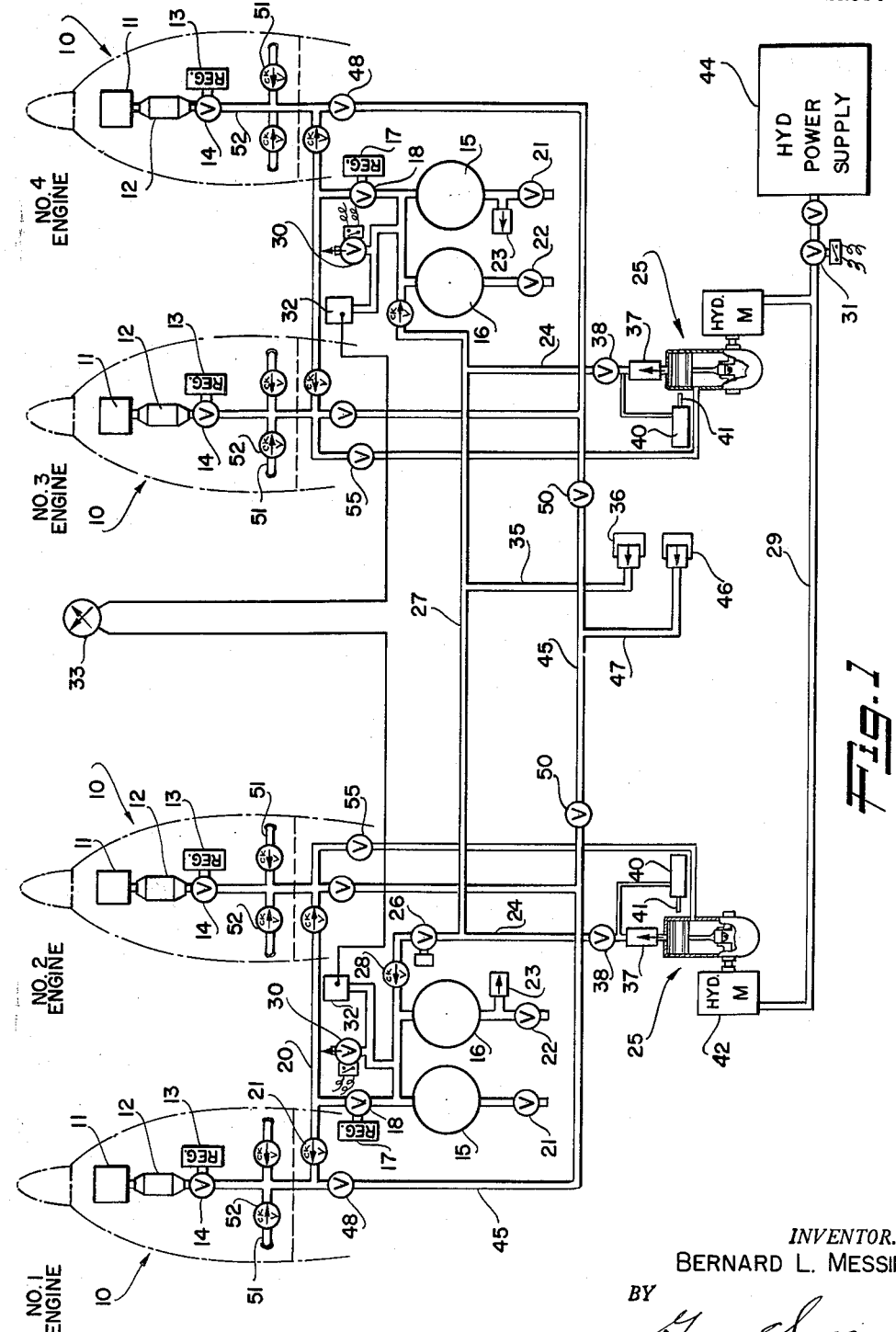
INVENTOR.
BERNARD L. MESSINGER
BY
George Sullivan
Agent

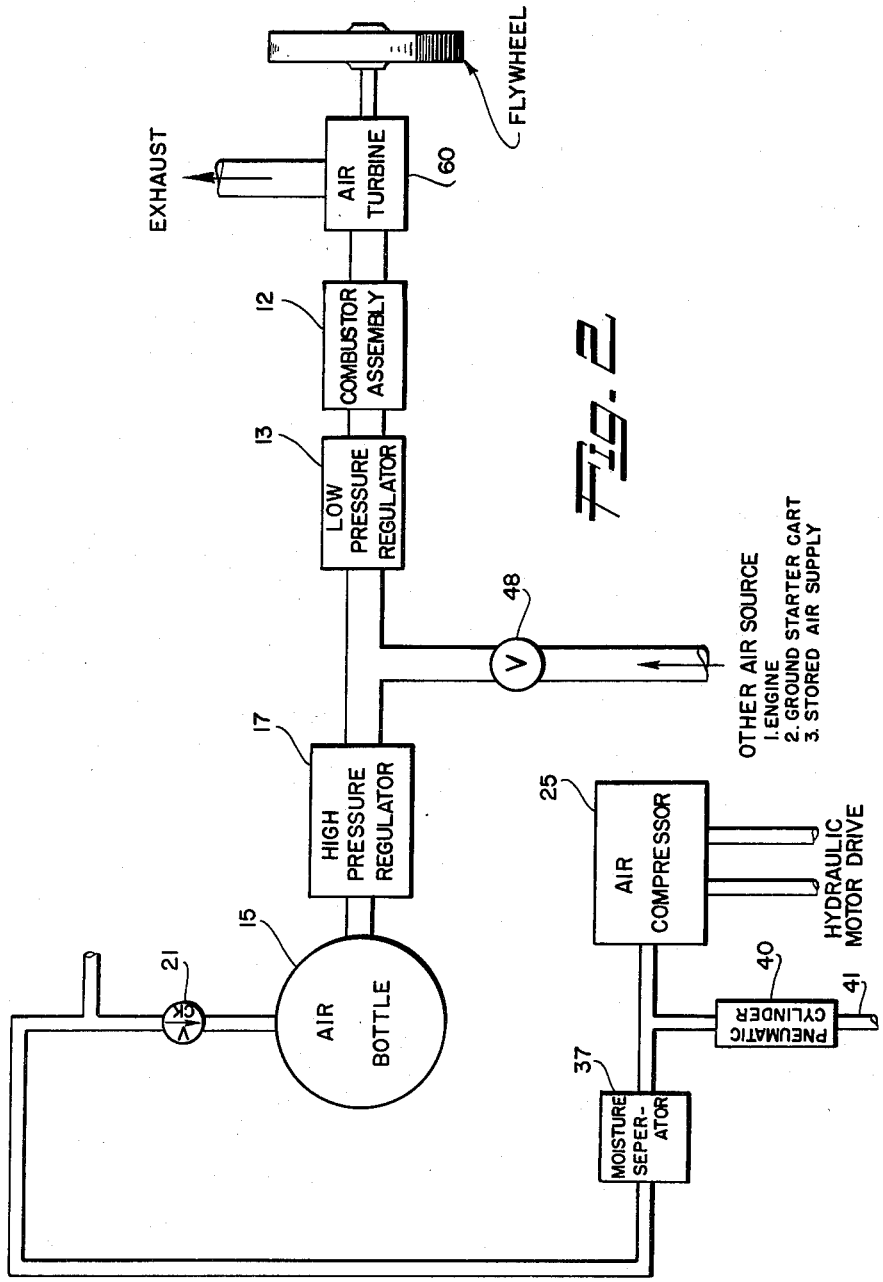

3,098,626
SYSTEM FOR STARTING GAS TURBINE
POWER PLANTS
Bernard L. Messinger, Sherman Oaks, Calif., assignor to
Lockheed Aircraft Corporation, Burbank, Calif.
Filed Nov. 21, 1960, Ser. No. 70,672
6 Claims. (Cl. 244—53)

The present invention relates generally to jet and prop-jet propulsion apparatus and specifically to a means for starting gas turbine engines used in reaction-type propulsion units and powerplants.

The ever increasing size of jet and prop-jet propulsion apparatus, with rotatable parts of considerable mass requiring a large expenditure of energy to bring them to the minimum rotational speed necessary for the development of useful power, has presented the problem of the provision of adequate starting means, the size and weight of which are limited to a great extent by aircraft design. To less extent, a similar problem exists wherever the larger sizes of gas turbines are used, e.g., as in stationary powerplants for secondary sources of power, if not as the principal sources.

In the aircraft industry the starting of turbine powered aircraft, in many cases, necessitates the use of expensive ground-support equipment containing a source of heated compressed air which may be coupled to the engine starter turbine for supplying heated compressed air to the turbine to initiate engine turnover. The system of the present invention is a self-contained pneumatic starting system carried on an aircraft which will permit engine starting independent of any ground source of compressed air and which also includes a provision for employing ground sources of compressed air as an optional feature as well as deriving engine starting from bleed air supplied by running engines. Therefore, the engine starting system of the present invention is not dependent on ground sources of compressed air.

All aircraft incorporating the starting system of the present invention as a self-contained engine starting system may be operated from any terminal without the requirement of auxiliary ground starting equipment. The self-contained feature may utilize air stored in high pressure air bottles carried aboard the aircraft. The stored air capacity is sufficient for several engine starts and switch means can be employed for limiting the selection of engines for initial starts on multi-engine aircraft. The remaining engines may be started using the bleed air from two engines operating at low speed ground idle or from one engine operating at high speed ground idle. At the option of the operator, initial engine starts may be obtained or an individual engine may be motored by using available ground equipment to supply air through a suitable air connection in the aircraft.

Accordingly, it is a primary object of the present invention to provide a new and improved means for a method of starting gas turbine engines used in jet and prop-jet propulsion.

Still another object of the present invention is to provide a novel gas turbine starting system whereby the engine may be started selectively from bleed air from other engines, from a ground supply of compressed air or from a self-contained compressed air source carried on the aircraft.

Still a further object of the present invention is to provide a novel starting system for gas turbine powerplants having adequate safety features and precautions so that malfunction of system equipment will not cause fires, explosions, or damage to the aircraft.

The above and other objects and features of the invention will appear more fully hereafter from a consideration of the following description taken in connection with the accompanying drawings wherein one embodiment of the invention is illustrated by way of example, wherein:

FIGURE 1 is a schematic drawing of a complete gas turbine engine power starting system in accordance with the present invention; and FIGURE 2 is a simplified schematic drawing of the starting system employed in the embodiment of FIGURE 1.

With reference to FIGURE 1, a self-contained engine starting system is shown for incorporation in a multiple engine aircraft having four identical engines, for example. For purposes of clarity, the engines per se are not shown in the drawings since the engine are not a part of the present invention; however, each engine is housed in a nacelle such as a nacelle 10 shown in broken lines to indicate the general placement of the aircraft engines relative to each other and with respect to the starting systems components.

Some of the details and components of the starting system are repeated for each engine of the four so that for purposes of this description, the elements of the system associated with a single engine will be initially described.

Each engine is provided with a pneumatic starter indicated generally by reference numeral 11 which may be suitably mounted on the engine gear box and comprises a turbine connected through reduction gearing to a starter jaw. The starter jaw is adaped to be connected to the engine to be started in a conventional manner. Details of the turbine, reduction gearing and starter jaw have been omitted as the structure thereof forms no part of the present invention. A combustor 12 is suitably connected to the turbine of the starter 11 by means of an air supply duct upstream of the starter. Also in series with the combustor 12 and the starter 11, there is provided a low pressure regulator 13 and a shutoff valve 14 located upstream in the air supply duct from the combustor.

Two high pressure air bottle storage systems are employed in the engine starting system of the present invention wherein the one system of the pair is connected to start engines 1 and 2 while the other is employed for starting engines 3 and 4. For purposes of the present invention, a pneumatic pressure of 3,000 p.s.i. is employed for each air bottle storage. Each air bottle storage system of the pair includes two air storage bottles 15 and 16. The air bottle storage system is connected to the air supply duct via a high pressure regulator 17 and a shutoff valve 18. Air stored in the bottles 15 and 16 on one side of the aircraft may be ducted through the high pressure air regulator and shutoff valve to either of the two low pressure regulator and shutoff valves on the same side of the aircraft via a duct 20 connected to the air supply ducts of each engine through a check valve 21.

The high pressure regulators 17 serve to reduce the 3,000 p.s.i.g. air bottle pressure to a nominal pressure of 135 p.s.i.f. prior to admission to the low pressure regulators 13. The low pressure regulators further reduce the pressure of the air from all sources to a nominal 47.5 p.s.i.g. prior to entering the starter. The line combustors 12 heat the starting air to a nominal 1,000° F. prior to entering the starter 11. A feature in the invention by the use of such a combustor since air bottles would have to be extremely enlarged to hold heated air or to be heated while in the bottles. Each air bottle 15 and 16 is provided with a moisture drain and blowout valve 21 and 22 respectively to remove any moisture development in the air bottles and to relieve the bottles of excessive pressure which may develop beyond the limits of rated pressure level. A blowout disc assembly 23 includes a thermo-element so that should valves 21 or 22 fail or the temperature increased beyond 500°, disc 23 will open to relieve pressure build-up in the bottles. The bottles are connected in parallel respective to high pressure regulator 17 and in parallel to an input air supply line 24 leading from an air compressor system indicated in general by the reference numeral 25.

Air bottles 15 and 16 associated with the engine starting system for engines 1 and 2 for example, are filled after the air bottles associated with the starting system connected to the other engines 3 and 4 of the aircraft are filled by means of a priority valve 26 connected in the line 24. Connected to line 24 between the priority valve 26 and the compressor 25, there is provided a duct 27 which communicates between the two parallel starting systems associated with the multiple engines on each side of the aircraft. Priority valve 26 is so adjusted that when the two air bottles associated with one side of the aircraft are filled, valve 26 will open and permit the high pressure air to be stored in the other two air bottles until maximum pressure has been achieved in the bottles. Check valve 28 located between the air bottles and the priority valve 26 prevents reverse flow of high pressure air when the priority valve is open.

A combined pressure switch and relief valve 30 senses the pressure in the bottles and when the maximum desired pressure has been reached, a signal is transmitted to a compressor shutoff valve 31 in a line 29 which prevents an additional supply of compressed air from the compressor. Also, the signal from pressure switch 30 will turn off the compressors when both systems have been fully charged. If the relief valve fails, the combination pressure blowout disc 23 will unload at 4,000 p.s.i.g. and will dump the bottle air. Pressure is retained in the bottles by the check valves 28 in the supply line.

Connected in parallel with the combined pressure switch and relief valve, there is provided a pressure transmitter 32 which provides a signal to a read-out indicator 33 located in the control flight station of the aircraft for a visual indication of the pressure present in either of the two air bottle systems.

Should it be desired to employ a ground starter compressor disassociated with the airplane, a line 35 couples into line 27 at one end and on the opposite end is provided with a suitable coupling 36 for detachably coupling to the ground starter compressor. In this instance, when the air bottles are to be filled by such a source of compressed air, the compressor 25 are not operative. Such selection is done by an operator from the flight station.

Compressor 25 is of any suitable variety but in the present drawing as shown by representation as a hydraulic motor-driven compressor for supplying high pressure air to the air bottles 15 and 16. The air has approximately 98% of its free water removed before storing in the bottles by a suitable moisture separator 37. The efficiency of the separator is increased by the addition of a back pressure valve 38 located immediately downstream of the separator, which is adjusted to maintain at least 1550 p.s.i.g. minimum pressure on the unit. The separator also contains a heater (not shown) which prevents freezing of the trapped moisture. A compressor cooling door actuator 40 is shown suitably coupled upstream from the moisture separator 37 having a rod 41 extended therefrom so that upon the presence of air pressure in the supply line, the actuator will cause a cooling door (not shown) located in the engine nacelle to open to permit ambient cool air into the compressor area for temperature reduction purposes.

In general, when the airplane is on the ground, the compressor is driven by a suitable hydraulic motor 42 connected via the duct 29 to a suitable source of hydraulic power 44. Under normal conditions, the charging time required for air bottles 15 and 16 while the aircraft is on the ground consumes approximately thirty minutes.

By means of a ducting system 45 including lead-in line 47 having a coupling 46 connected thereon, it is possible to start any one of the four engines by using a ground starter cart having a suitable compressor and heat exchanger. The starter cart can be detachably connected to coupling 46 which would supply the necessary heated compressed air through ducting 45, through a bleed air and firewall shutoff valve 48 to the low pressure regulator 13 and shutoff valve 14. The closure of firewall valve 48 is under selective control from the aircraft flight station so that any one of the four engines may be so started. Connected in ducting 45, there is provided a pair of fuselage shutoff valves 50 so that ducting 45 associated with engines one and two can be isolated from engine three and four. This is employed as a safety feature should fire or other hazards warrant isolation of the two systems.

In addition to the starting the airplane engines by means of the self-contained storage bottle system or the ground starter cart system, it is noted that the ducting or manifold 45 including shutoff firewall valve 48 is connected directly to the engine manifold (not shown) via ducting 51 and check valve 52. This mode of engine starting is also under the selective control of the operator in the aircraft flight station so that the hot compressed engine bleed air derived from at least one started engine may be supplied via ducting 45 to any of the remaining three engines to be started.

In addition to charging the air bottles via a ground compressor cart via coupling 36 and line 27, the air bottles associated with each air bottle system may be charged while the aircraft is in flight by selectively operating either or both valves 55 when valves 48 are in their closed position so that the engine bleed air from engines two or three may be applied directly to the compressor wheel vanes. Such action will cause the compressor to operate sufficiently to supply compressed air via line 24 and 27 directly to the air bottles. When the indicator 33 shows a full charge, valve 55 may be shut off and the compressor operation stopped.

With reference to FIGURE 2, a simplified block diagram of the starting system of the present invention is shown which includes air bottle 15 for storing the required air as supplied by compressor 25 via moisture separator 37 and check valve 21. On demand, the air stored in the air bottle is passed through high pressure regulator 17 and thence through low pressure regulator 13 into the combustor assembly 12. For test purposes, an air turbine 60 having a flywheel 61 coupled thereto was employed for loading purposes rather than the starter turbine of an actual engine. Through such means, the operation of the system of the present invention was checked out and evaluated. Duct 62 is provided for exhausting the air from the air turbine 60. When such tests were carried out by employing the supply of air contained in the air bottle, valve 48 was in its closed condition. However, when it is desired to use other air sources than the supply held in the air bottle, such as from another engine, a stored air supply from a ground starter cart or from other stored air supplies, valve 48 would be opened so that the air supplied from these alternate sources could be applied directly to the low pressure regulator and then to the combustor assembly. Under such conditions, the air supplied from the alternate sources may be of greatly reduced pressure and less than the air stored in the air bottle containers.

Therefore, it can be seen from the above description of the engine starting circuit that an engine starting system for multi-engine aircraft is provided which incorporates a pair of identical starting systems. Each system of the pair may start its engines from a source of stored high pressured air in air bottles 15 and 16 or engine starts may be achieved through the connection of a ground starter cart to connector 46 or engine starts may take place from previously started engines.

Storage bottles 15 and 16 may be provided with high pressure air from the compressor 25 carried on the airplane for each starting system of the pair or the air bottles may be charged while the airplane is in flight by employing the bleed air from the previously stored running engine.

Adequate pressure indicating and safety valves are provided to insure against explosions and fire caused by an excessive buildup of pressure anywhere in the system.

Having described only typical forms of the invention I do not wish to be limited to the specific details herein set forth, but wish to reserve to myself any variations or modifications that may appear to those skilled in the art and fall within the scope of the following claims.

I claim:

1. An engine starting system for multi-engine aircraft comprising, an aircraft self-contained source of pressurized air carried on the aircraft, each engine having a starter unit, main ducting means connecting the self-contained source to the starter unit on a first engine of the aircraft, engine bleed air ducting connecting bleed air from a second engine of the aircraft to the main ducting means for supplying pressurized engine bleed air to the starter means of the first engine, ducting connected to the main ducting for detachably connecting a ground source of pressurized air independent of the aircraft to the starter unit of the first engine, valve means included in the main ducting for selectively connecting the main ducting with air supplied from the aircraft source, the ground source and the second engine bleed air source respectively, and an airborne compressor and ducting means connected to the self-contained source for recharging the source, and means connecting the bleed air ducting to the compressor for selective airborne operation of the compressor while in aircraft flight.

2. The invention as defined in claim 1 including means for connecting the self-contained source to a ground supply of compressed air for recharge.

3. The invention as defined in claim 2 including an air combustor connected in the main ducting means between the first engine and the self-contained source for heating the pressurized air when applied to the engine.

4. An engine starting arrangement for multi-engine aircraft comprising, a pair of similar engine starting systems carried on the aircraft whereby each system provides pressurized air for starting at least two engines associated with each side of the aircraft, each system of the pair including a main ducting means connected to each of the two engines via a low pressure regulator and valve means, an aircraft self-contained source of pressurized air associated with each system of the pair carried on the aircraft, a high pressure regulator and valve means coupling the self-contained source to the main ducting means downstream of the low pressure regulator and valve means, engine bleed air ducting interconnecting bleed air from the multi-engines of the aircraft to the main ducting means for supplying pressurized engine bleed air to the multi-engines, shutoff valve means in the bleed air ducting for determination of engine starting selection, ducting connected to the main ducting for detachably connecting a ground source of pressurized air independent of the aircraft to a selected engine, and valve means included in the main ducting for selectively connecting the main ducting with air supplied from the aircraft source, the ground source and the second engine bleed air source.

5. The invention as defined in claim 4 including a priority valve for charging the self-contained source of one system of the pair to full capacity before charging the other self-contained source.

6. The invention as defined in claim 4 including means connected in the main ducting means upstream from the low regulator and valve means for heating the pressurized air from the self-contained source when supplied to a selected engine.

References Cited in the file of this patent

UNITED STATES PATENTS

| | | |
|---|---|---|
| 2,465,099 | Johnson | Mar. 22, 1949 |
| 2,749,023 | Lewis | June 5, 1956 |
| 2,840,987 | Bloomberg et al. | July 1, 1958 |

FOREIGN PATENTS

| | | |
|---|---|---|
| 770,106 | Great Britain | Mar. 13, 1957 |